(12) United States Patent
Gleason et al.

(10) Patent No.: US 9,415,853 B2
(45) Date of Patent: Aug. 16, 2016

(54) SURFACE SEALING SYSTEM

(71) Applicant: The Boeing Company, Chicago, IL (US)

(72) Inventors: Michael P. Gleason, Edwardsville, IL (US); Daniel Eugene Pulcher, St. Charles, MO (US); Anthony C. Roberts, St. Paul, MO (US); William John Keyes, St. Charles, MO (US); Michael Allan Arrowsmith, Pocahontas, IL (US); Elizabeth Kay Kauffman, Chesterfield, MO (US); Amoret Margaret Lambrecht, St. Charles, MO (US); Alan F. Tegeler, O'Fallon, MO (US); Robert A. Gipperich, O'Fallon, MO (US); Mathew Albert Coffman, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 261 days.

(21) Appl. No.: 13/754,642

(22) Filed: Jan. 30, 2013

(65) Prior Publication Data
US 2014/0210165 A1 Jul. 31, 2014

(51) Int. Cl.
*F16J 15/06* (2006.01)
*B64C 1/14* (2006.01)
*B64C 7/00* (2006.01)

(52) U.S. Cl.
CPC ... *B64C 1/14* (2013.01); *B64C 7/00* (2013.01); *F16J 15/061* (2013.01); *F16J 15/062* (2013.01)

(58) Field of Classification Search
CPC ............ B64C 1/26; B64C 3/26; E04D 3/366; E04F 13/0803
USPC ...................... 244/131, 132; 52/461, 471, 463
See application file for complete search history.

(56) References Cited

U.S. PATENT DOCUMENTS

| | | | |
|---|---|---|---|
| 1,576,506 | A | 3/1926 | Davis |
| 1,972,545 | A | 9/1934 | Warren |
| 2,710,113 | A | 6/1955 | Pritchard |
| 3,074,520 | A | 1/1963 | Grubelich |
| 3,079,653 | A | 3/1963 | Cornell |
| 3,694,976 | A | 10/1972 | Warshaw |

(Continued)

FOREIGN PATENT DOCUMENTS

| | | |
|---|---|---|
| EP | 0654625 | 5/1995 |
| EP | 0822357 | 2/1998 |

(Continued)

OTHER PUBLICATIONS

International Preliminary Report on Patentability, dated Aug. 4, 2015, regarding Application No. PCT/US2013/077515, 5 pages.

(Continued)

*Primary Examiner* — Kristina Fulton
*Assistant Examiner* — L. Susmitha Koneru
(74) *Attorney, Agent, or Firm* — Yee & Associates, P.C.

(57) ABSTRACT

A method and apparatus comprising a sealing member, an integral structure associated with the sealing member, and an engagement section extending from the sealing member. The sealing member is configured to be attached to a surface of an object. The sealing member is consolidated with the integral structure. The engagement section is deformable and configured to engage a receiving structure in the object.

19 Claims, 11 Drawing Sheets

(56) References Cited

U.S. PATENT DOCUMENTS

| | | | |
|---|---|---|---|
| 3,848,379 A | 11/1974 | Hazen | |
| 4,533,278 A | 8/1985 | Corsover et al. | |
| 4,676,252 A | 6/1987 | Trautman et al. | |
| 4,718,211 A | 1/1988 | Russell et al. | |
| 4,773,791 A | 9/1988 | Hartkorn | |
| 4,781,489 A | 11/1988 | Buckenauer | |
| 4,866,898 A | 9/1989 | LaRoche et al. | |
| 4,977,719 A | 12/1990 | LaRoche et al. | |
| 5,001,865 A | 3/1991 | Procton | |
| 5,014,934 A * | 5/1991 | McClaflin | B64C 1/12 244/129.4 |
| 5,045,635 A * | 9/1991 | Kaplo | H02B 1/16 174/354 |
| 5,126,185 A | 6/1992 | Forrest et al. | |
| 5,156,360 A | 10/1992 | Shine | |
| 5,197,250 A | 3/1993 | Kramer | |
| 5,269,624 A | 12/1993 | Kramer | |
| 5,357,727 A | 10/1994 | Duckworth et al. | |
| 5,365,713 A | 11/1994 | Nicholas et al. | |
| 5,447,594 A * | 9/1995 | Josefsson | B29C 43/24 156/307.1 |
| 5,466,531 A * | 11/1995 | Tippett | B29C 66/71 156/228 |
| 5,586,772 A | 12/1996 | Deaver | |
| 5,902,956 A * | 5/1999 | Spies | H05K 9/0015 174/358 |
| 5,941,061 A | 8/1999 | Sherry et al. | |
| 6,030,022 A | 2/2000 | Bormann et al. | |
| 6,082,240 A | 7/2000 | Middione et al. | |
| 6,105,973 A * | 8/2000 | Butler | E06B 3/62 277/638 |
| 6,257,592 B1 | 7/2001 | Hashizawa et al. | |
| 6,598,883 B1 * | 7/2003 | Hammi | F16J 15/122 277/312 |
| 6,619,879 B1 | 9/2003 | Scuero | |
| 6,655,635 B2 | 12/2003 | Maury et al. | |
| 7,784,799 B2 | 8/2010 | Etling | |
| 7,887,063 B2 * | 2/2011 | Rueger | F16J 15/123 277/594 |
| 9,016,967 B2 * | 4/2015 | Law | A61M 35/006 401/134 |
| 2003/0084634 A1 * | 5/2003 | Stanchfield | E04F 15/02005 52/464 |
| 2005/0110219 A1 * | 5/2005 | Tsuboi | F16J 15/344 277/358 |
| 2005/0140098 A1 * | 6/2005 | Etling | B64C 1/12 277/630 |
| 2008/0258008 A1 * | 10/2008 | Cooper | B64C 1/12 244/131 |
| 2010/0077690 A1 * | 4/2010 | Durand | B64C 1/12 52/578 |
| 2010/0077695 A1 * | 4/2010 | Delort | B64C 3/26 52/741.4 |
| 2010/0320325 A1 * | 12/2010 | Parikh | B64C 1/12 244/130 |
| 2012/0163990 A1 * | 6/2012 | Shimono | B29C 70/342 416/244 R |
| 2014/0224932 A1 * | 8/2014 | Cardin | B64C 1/069 244/119 |

FOREIGN PATENT DOCUMENTS

| | | |
|---|---|---|
| EP | 1103461 | 5/2001 |
| WO | WO2005066526 | 7/2005 |

OTHER PUBLICATIONS

International Search Report and Written Opinion, dated Apr. 28, 2014, regarding Application No. PCT/US2013/077515, 9 pages.

USPTO final office action dated Mar. 20, 2006 regarding U.S. Appl. No. 10/749,762, 7 Pages.

USPTO final office action dated Jun. 19, 2007 regarding U.S. Appl. No. 10/749,762, 6 Pages.

USPTO final office action dated Aug. 17, 2009 regarding U.S. Appl. No. 10/749,762, 8 Pages.

USPTO non-final office action dated Nov. 24, 2006 regarding U.S. Appl. No. 10/749,762, 6 Pages.

USPTO non-final office action dated Nov. 29, 2007 regarding U.S. Appl. No. 10/749,762, 7 Pages.

USPTO non-final office action dated Feb. 17, 2009 regarding U.S. Appl. No. 10/749,762, 11 Pages.

USPTO non-final office action dated May 31, 2005 regarding U.S. Appl. No. 10/749,762, 7 Pages.

USPTO non-final office action dated Jul. 8, 2008 regarding U.S. Appl. No. 10/749,762, 6 Pages.

USPTO notice of allowance dated Apr. 26, 2010 regarding U.S. Appl. No. 10/749,762, 4 Pages.

PCT search report dated Oct. 20, 2005 regarding PCT/US2004/042946, application WO2005066526 dated Jul. 21, 2005, applicant the Boeing Company, 2 Pages.

* cited by examiner

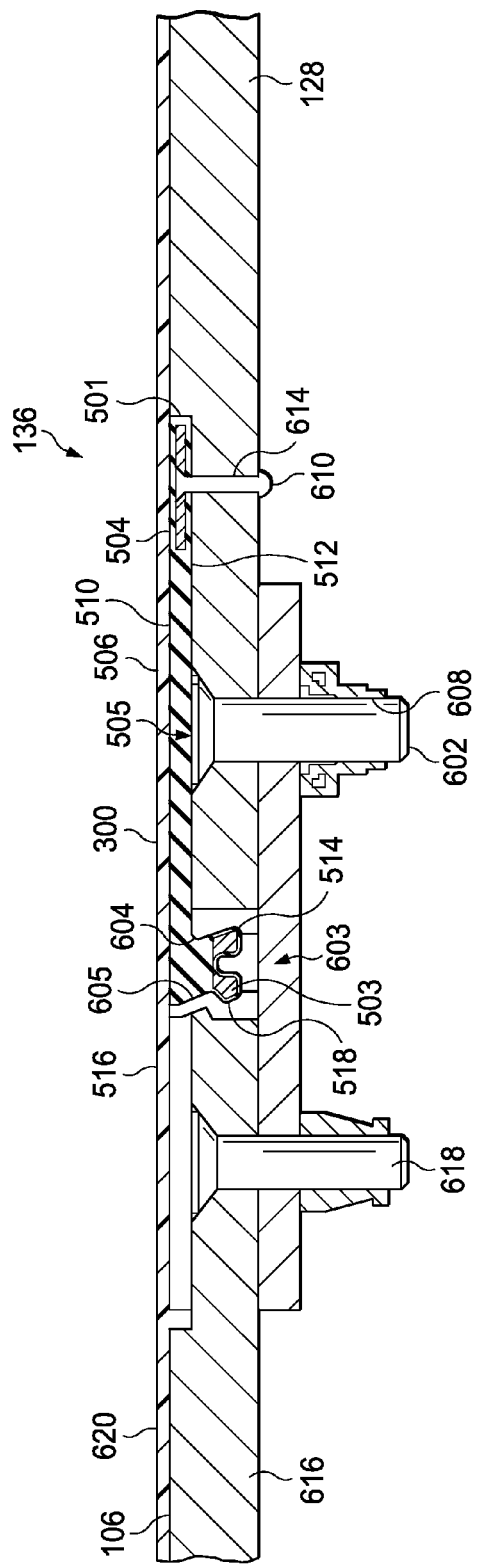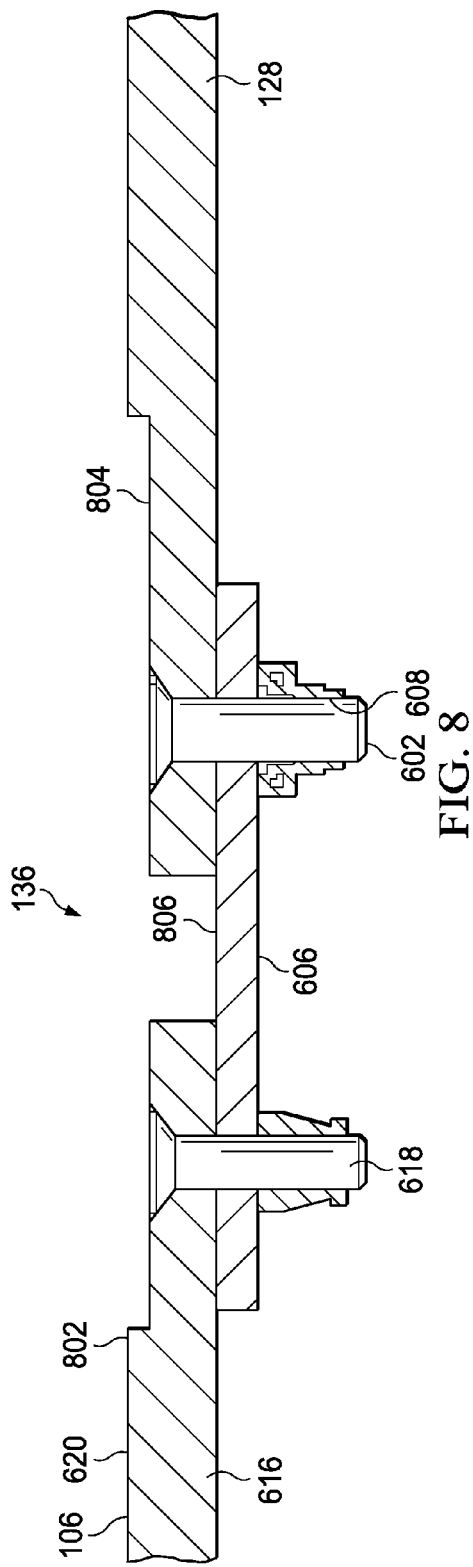

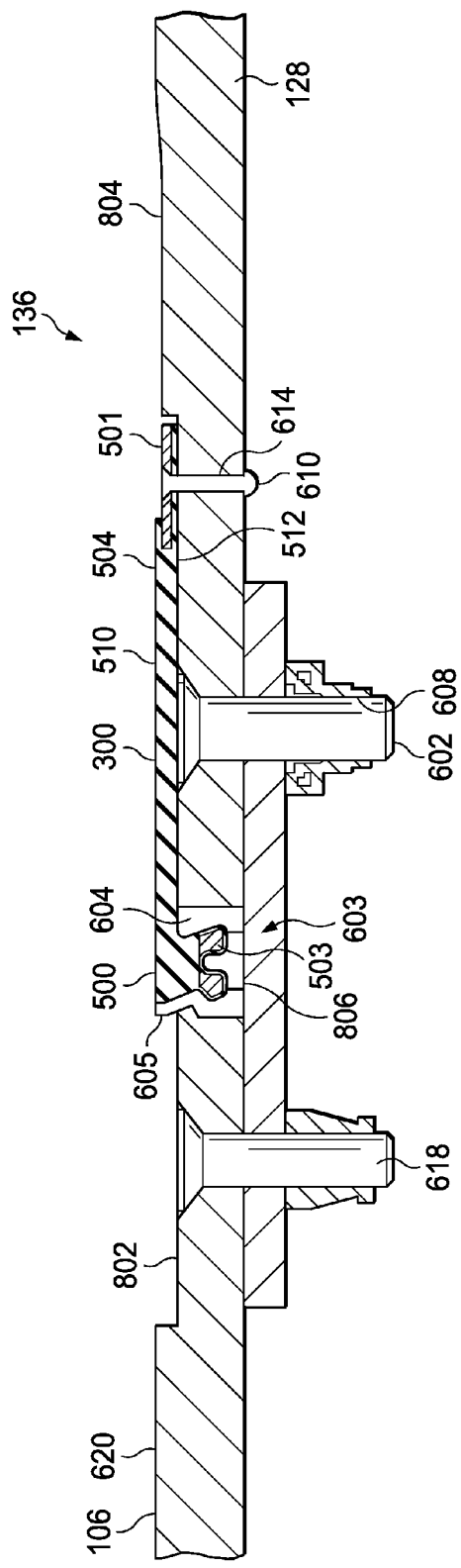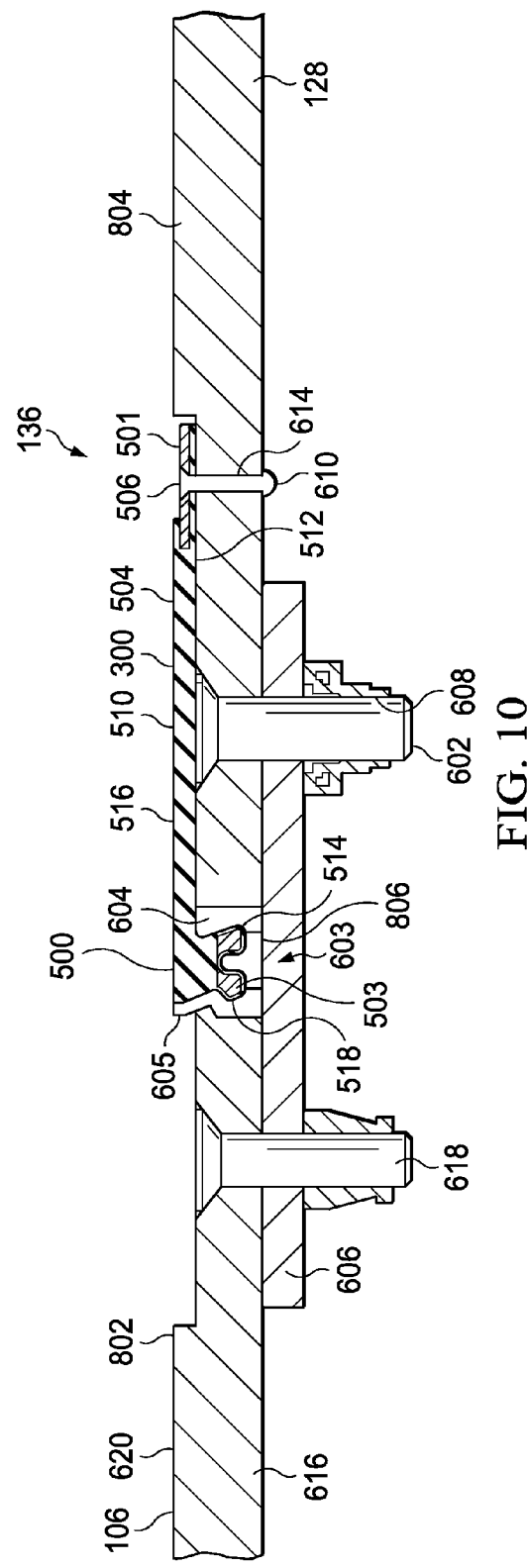

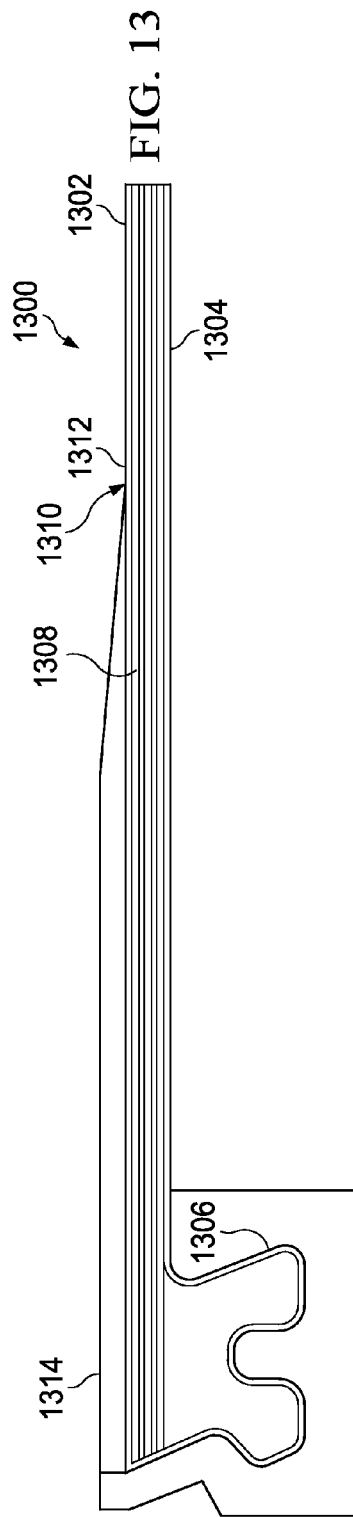
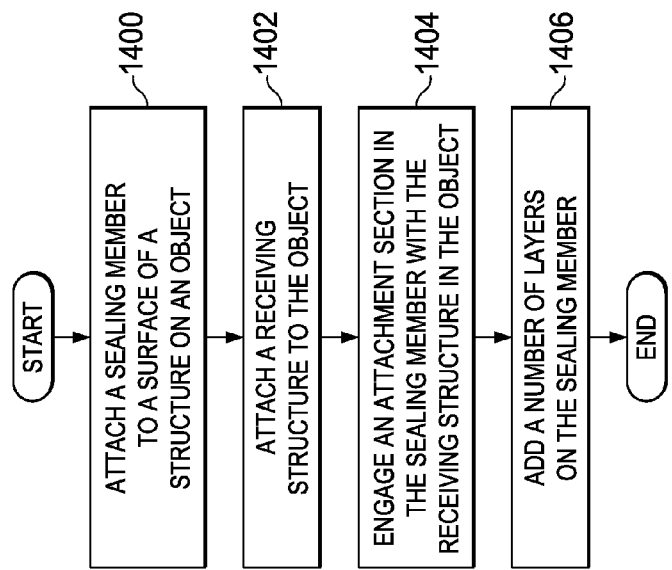
FIG. 13
FIG. 14

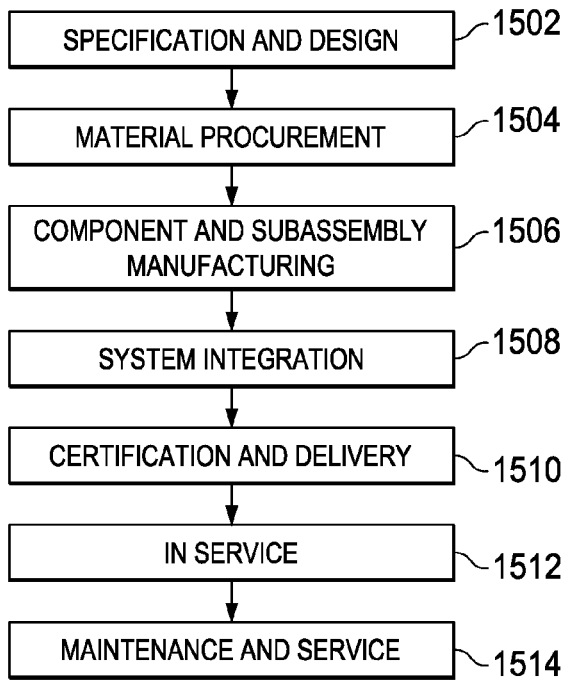
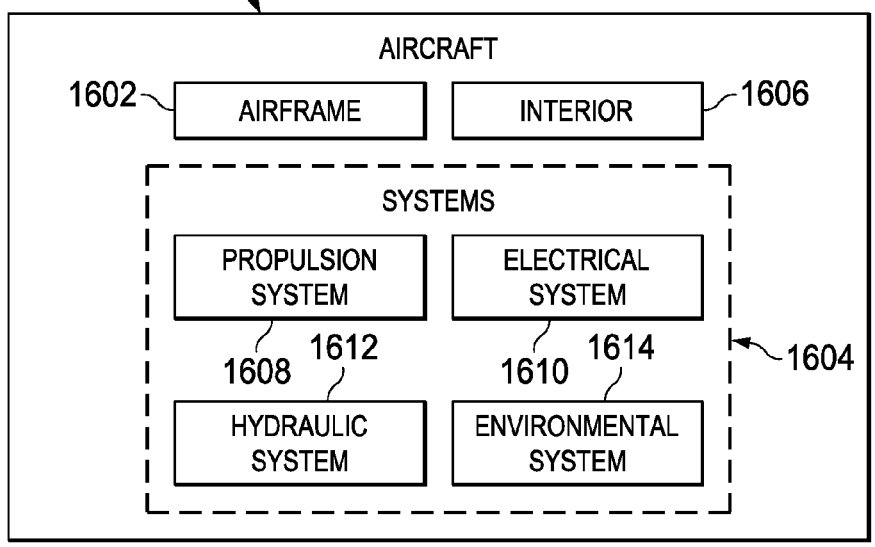

SURFACE SEALING SYSTEM

BACKGROUND INFORMATION

1. Field

The present disclosure relates generally to sealing systems and, in particular, to sealing systems for objects. Still more particularly, the present disclosure relates to a method and apparatus for sealing the surface of an object with a sealing system that is removable to provide access to the surface of the object in which the sealing system may be reused to reseal the surface.

2. Background

Sealing systems are used on objects for many different purposes. For example, the surface of an aircraft may be sealed by a sealing system. The sealing of the surface of the aircraft may be performed for a number of different reasons.

As an example, a sealing system may be used to protect the surface of the aircraft from the environment. A sealing system may be used to protect the surface of an aircraft from water fuel, hydraulic fluids, oils, and other undesirable chemicals or contaminants that may be present in the environment.

Sealing systems also may be used to provide a smooth surface on an object. The smooth surface may be used to provide a desired level of aerodynamic performance for the object.

Additionally, sealing systems may be used to electrically close or seal aircraft bays for electromagnetic interference control. These sealing systems may also protect electronic and electrical components within the bay from potential external emission sources such as communications towers, weather radar systems, and other potential emissions sources.

In some cases, the surface of the aircraft sealed by a sealing system may need to be accessed at a later time after the surface has been sealed. For example, an aircraft may have service panels and doors that provide access to different systems and components within the interior of the aircraft. These doors may be secured using fastener systems, such as bolts or rivets.

After these service panels and doors are secured, the entire aircraft may be coated with several layers of coatings. These coatings may include paint, sealants, and other materials. These coatings may be used to provide a desired sealing function as well as a desired aerodynamic smoothness for the aircraft.

At a later time, after coatings have been applied to the surface of the aircraft, maintenance may need to be performed on the aircraft. This maintenance may involve accessing the interior of the aircraft through service panels and doors.

During maintenance, the coatings and sealants are typically removed from the joints and surrounding area of the service panels and doors. As a result, the areas where the coatings and sealants are removed from the aircraft are no longer protected from the environment or may not have a smooth surface that provides a desired level of aerodynamic performance.

Once the maintenance has been completed, these areas are reworked to re-establish sealing function. The rework may include applying multiple layers of paint and sealant over the areas in which the overcoats were removed. This repainting of the surface of the aircraft in these locations may be more time-consuming and labor-intensive than desired. Therefore, it would be desirable to have a method and apparatus that takes into account at least some of the issues discussed above, as well as other possible issues.

SUMMARY

In one illustrative embodiment, an apparatus comprises a sealing member, an integral structure associated with the sealing member, and an engagement section extending from the sealing member. The sealing member is configured to be attached to a surface of an object. The sealing member is consolidated with the integral structure. The engagement section is deformable and configured to engage a receiving structure in the object.

In another illustrative embodiment, a method for sealing an object is present. A sealing member is attached to a surface of a structure on the object. An integral structure is associated with the sealing member in which the sealing member is consolidated with the integral structure. An engagement section is engaged with a receiving structure in the object. The engagement section extends from the sealing member. The engagement section is deformable.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a sealing system on a service panel in an aircraft in accordance with an illustrative embodiment;

FIGS. 8-11 are illustrations of the installation of a sealing system in accordance with an illustrative embodiment;

FIG. 13 is an illustration of another configuration for a sealing system in accordance with an illustrative embodiment;

FIG. 14 is an illustration of a flowchart of a process for sealing an object in accordance with an illustrative embodiment;

FIG. 15 is an illustration of an aircraft manufacturing and service method in accordance with an illustrative embodiment; and FIG. 16 is an illustration of an aircraft in which an illustrative embodiment may be implemented.

DETAILED DESCRIPTION

The illustrative embodiments recognize and take into account one or more different considerations. For example, the illustrative embodiments recognize and take into account that using a sealing system that is reusable may reduce the amount of time needed to return the aircraft to a state with a desired level of aerodynamic performance. For example, the illustrative embodiments recognize and take into account that having a sealing member that may be removable and reused may reduce the need for applying coatings of material to return the surface to a state that provides a desired level of aerodynamic performance. Further, if coatings are reapplied, the number of coatings may be reduced with the use of a sealing member that is reusable.

The illustrative embodiments recognize and take into account that with a reusable sealing system, access to service panels and doors may be made more easily than currently possible with existing sealing systems. For example, the illustrative embodiments recognize and take into account that removing a sealing system may take less time than removing coatings from the surface of the area around service panels and doors. Additionally, restoring the seal in these areas may be more easily and quickly formed through the use of a reusable sealing system.

The illustrative embodiments also recognize and take into account that a sealing member in a sealing system also may be subjected to different loads. The illustrative embodiments recognize and take into account that having a sealing member that is configured to carry desired loads in addition to covering a surface may be desirable.

Thus, the illustrative embodiments provide a method and apparatus for sealing an object. In one illustrative embodiment, an apparatus comprises a sealing member, an integral structure associated with the sealing member, and an engagement structure. The sealing member is configured to be attached to a surface of an object. The sealing member is consolidated with the integral structure. The engagement section extends from the sealing member. The engagement section is deformable and is configured to receive a receiving structure in the object.

Figure 1:
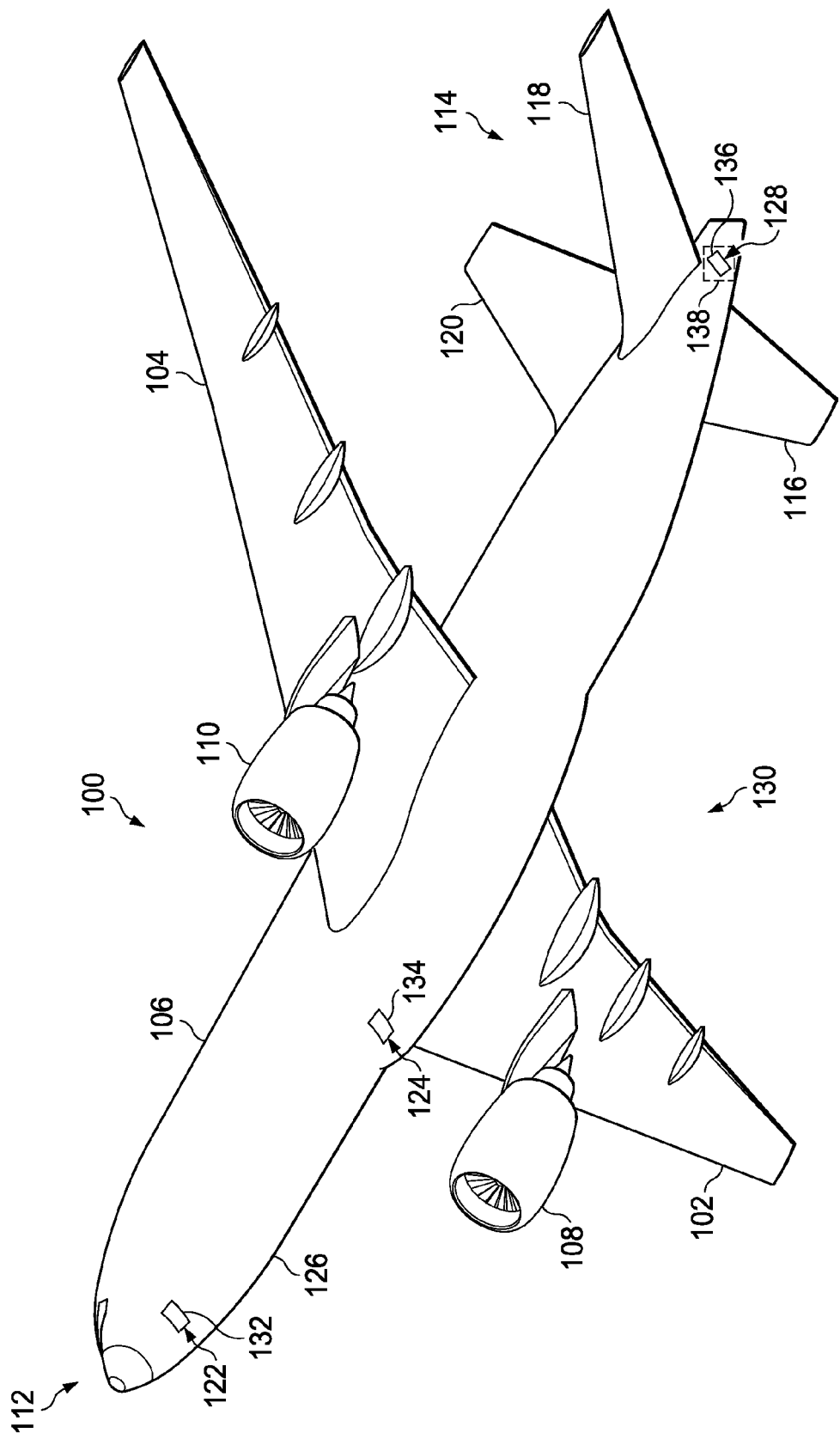
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106. Aircraft 100 also includes engine 108 attached to wing 102, and engine 110 attached to wing 104.

Fuselage 106 has nose section 112 and tail section 114. Horizontal stabilizer 116, horizontal stabilizer 118, and vertical stabilizer 120 are located in tail section 114 of fuselage 106.

Aircraft 100 is an example of an aircraft in which sealing systems 130 may be implemented in accordance with an illustrative embodiment. In this illustrative example, aircraft 100 includes service door 122 and service door 124 on lower side 126 of fuselage 106.

Additionally, aircraft 100 also includes service panel 128 on lower side 126 of fuselage 106. In these illustrative examples, sealing systems 130 may be used with service door 122, service door 124, and service panel 128, as shown in this illustrative embodiment.

As depicted, sealing system 132 seals service door 122. Sealing system 134 seals service door 124, and sealing system 136 seals service panel 128.

In these illustrative examples, sealing systems 130 may provide protection from the environment, a desired level of aerodynamic performance, and other types of desired performance. For example, sealing systems 130 also may provide a desired profile, level of conductivity, and level of engagement for shielding with respect to electromagnetic waves.

In these illustrative examples, sealing systems 130 may be implemented in accordance with an illustrative embodiment. A more detailed illustration of section 138 with sealing system 136 for service panel 128 is described in more detail in FIG. 3.

Figure 2:
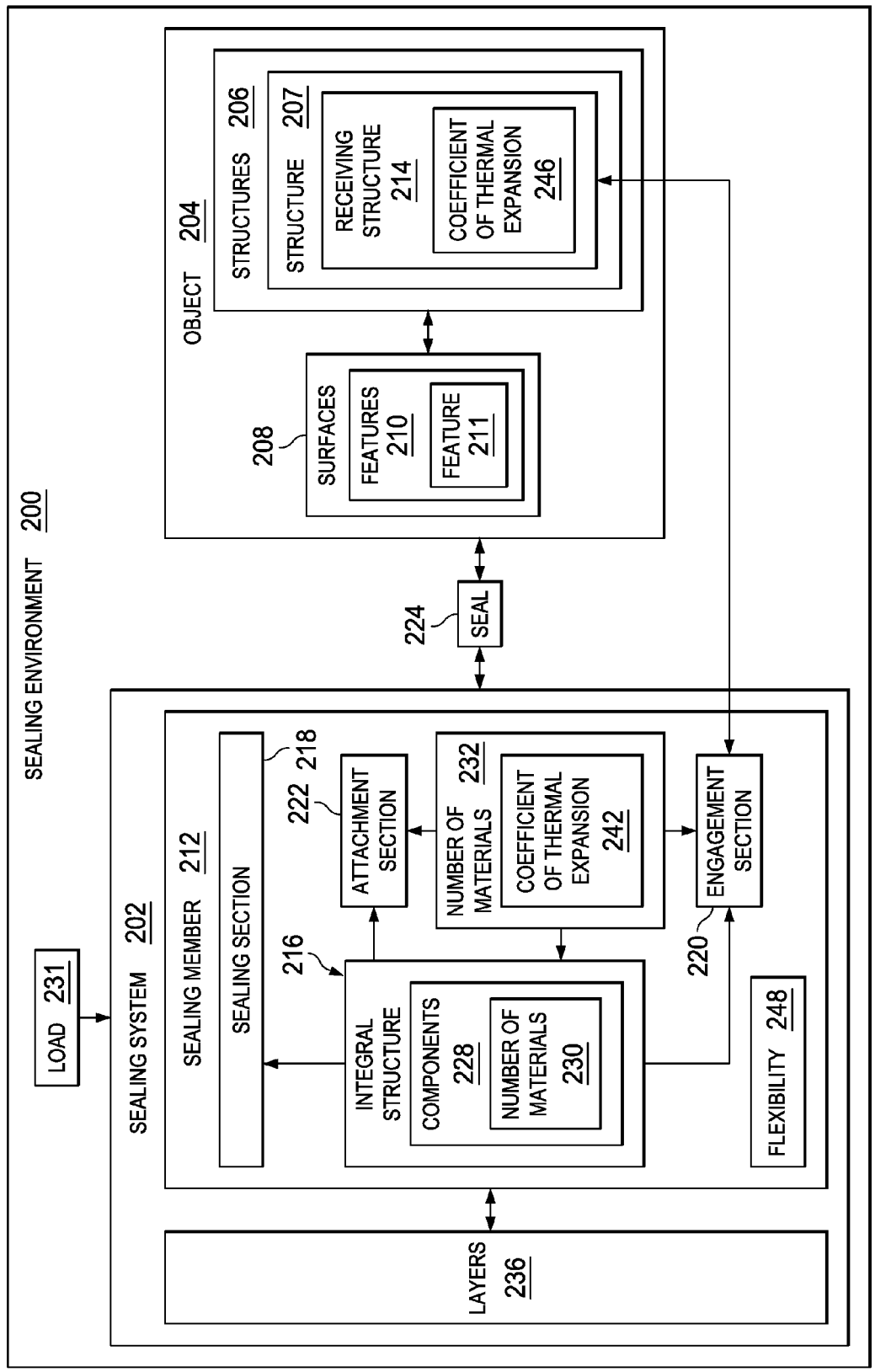
FIG. 2 is an illustration of a sealing environment in the form of a block diagram in accordance with an illustrative embodiment.

Turning now to FIG. 2, an illustration of a sealing environment in the form of a block diagram is depicted in accordance with an illustrative embodiment. In these illustrative examples, sealing system 132, sealing system 134, and sealing system 136 in FIG. 1 are examples of sealing system 202.

In this depicted example, sealing environment 200 comprises sealing system 202. Sealing system 202 is configured to seal object 204. In particular, sealing system 202 may be used to seal a number of structures 206 in object 204. In these illustrative examples, sealing system 202 may seal a number of surfaces 208 for one or more of structures 206 in object 204. Surfaces 208 may be on the exterior or interior of object 204 depending on the particular implementation. In these illustrative examples, structure 207 in structures 206 may be at least one of a door, a service panel, or other suitable structures.

Sealing system 202 also may seal a number of features 210 that may be present in surfaces 208 of structures 206. Features 210 may take various forms. For example, feature 211 in features 210 may be selected from one of a cover, an opening, a gap, an aperture, or some other suitable feature that may be present in surfaces 208, structures 206, or both.

In these illustrative examples, sealing system 202 is comprised of sealing member 212. Sealing member 212 may be connected to receiving structure 214 in structure 207 in structures 206. As depicted, sealing member 212 includes sealing section 218 and engagement section 220. Additionally, sealing member 212 also may include attachment section 222.

As depicted, engagement section 220 extends from sealing member 212. In particular, engagement section 220 may extend from sealing section 218 of sealing member 212. Engagement section 220 is deformable in these illustrative examples.

Further, engagement section 220 is the portion of sealing member 212 that is configured to engage receiving structure 214 in object 204. When engagement section 220 is engaged with receiving structure 214, sealing member 212 may be held in place on object 204 to provide seal 224.

Attachment section 222 may be comprised of a material that may be less pliable than sealing section 218. For example, attachment section 222 may be configured to be connected to structure 207 in object 204 by a fastening system.

Additionally, integral structure 216 is associated with sealing member 212. When one component is "associated" with another component, the association is a physical association in the depicted examples. For example, a first component may be considered to be associated with a second component by being secured to the surface of the second component, bonded to the second component, mounted to the second component, welded to the second component, fastened to the second component, consolidated within the second component, located within the second component in some other fashion, and/or connected to the second component in some other suitable manner. The first component also may be connected to the second component using a third component. The first component may also be considered to be associated with the second component by being formed as part of and/or an extension of the second component.

In this illustrative example, integral structure 216 may be located within the interior of sealing member 212. In other illustrative examples, integral structure 216 may be located on the surface of sealing member 212.

In these depicted examples, integral structure 216 may be located in at least one of sealing section 218, engagement section 220, and attachment section 222. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

In these illustrative examples, integral structure 216 may be comprised of a number of components 228 selected from at least one of a fabric, a cloth, threads, tows, rods, a reinforcement infused with resin, resin, a prepreg, a mesh, and other suitable components. Integral structure 216 and, in particular, components 228 in integral structure 216, may be comprised of number of materials 230 selected from at least one of a unidirectional material, fiberglass, a para-aramid, carbon, metal, and other suitable types of materials.

In these depicted examples, sealing member 212 is consolidated with integral structure 216 in a number of different ways. Consolidation of these components may include a process for curing in an autoclave, vacuum sealing, fabricating, or other suitable consolidation techniques. In one example, sealing member 212 may be fabricated with integral structure 216 located within sealing member 212. In other illustrative examples, integral structure 216 may be co-cured with sealing member 212. In other words, if integral structure 216 includes components that are cured, these components may be cured at the same time as sealing member 212.

In these illustrative examples, integral structure 216 may be located in at least one of sealing section 218, engagement section 220, and attachment section 222 of sealing member 212. In one illustrative example, integral structure 216 may be located in sealing section 218. In other illustrative examples, integral structure 216 may be located in both sealing section 218 and engagement section 220. In still other illustrative examples, integral structure 216 may be located in sealing section 218 and attachment section 222. When integral structure 216 is located in different sections of sealing member 212, integral structure 216 may be configured either differently or the same in those different sections.

In these illustrative examples, integral structure 216 within sealing member 212 may be implemented in a manner that allows sealing member 212 to carry load 231. Load 231 may take various forms. For example, load 231 may be at least one of an aerodynamic load, a mechanical load, or some other suitable load. These loads may be identified based on various requirements or design specifications. In these illustrative examples, load 231 may be maintained using integral structure 216 within sealing member 212 in a manner that maintains a desired level of flexibility 248 in sealing member 212 that provides seal 224 at a desired level on object 204.

As depicted, sealing section 218, engagement section 220, and attachment section 222 in sealing member 212 may be comprised of a number of different types of materials. In these illustrative examples, number of materials 232 may be selected from at least one of a thermoplastic material and a thermoset material. More specifically, number of materials 232 may be selected from at least one of an epoxy, a urethane, a silicone resin, a fluorosilicone resin, a para-aramid, carbon, fiberglass, and other suitable types of materials 232.

Number of materials 232 may be different or the same for the different sections in sealing member 212. For example, sealing member 212 may be comprised of a thermoset material, while engagement section 220 may be comprised of a thermoplastic material. In this manner, engagement section 220 allows for a desired deformation 220 to engage receiving structure 214 or to be disengaged from receiving structure 214. In other words, when a thermoplastic material becomes less pliable, engagement section 220 may remain engaged with receiving structure 214.

In these illustrative examples, number of materials 232 for sealing section 218 may be selected such that sealing section 218 provides seal 224 for features 210 in surfaces 208 for structures 206 in object 204. For example, number of materials 232 may be selected such that sealing section 218 is elastomeric.

In these illustrative examples, number of materials 232 also may be selected to withstand the environment in which object 204 operates. For example, if object 204 takes the form of aircraft 100, number of materials 232 for sealing section 218, engagement section 220, and attachment section 222 and number of materials 230 for integral structure 216 may be selected as ones that may withstand operating temperatures for aircraft 100.

As an example, number of materials 232 and number of materials 230 may be selected to withstand temperatures from about −65 degrees Fahrenheit to about 190 degrees Fahrenheit. Further, number of materials 232 may be selected as ones that may be resistant to chemicals such as oil, fuel, and other chemicals. Further, number of materials 232 and number of materials 230 may be selected as ones that may be resistant to ultraviolet light. In addition, number of materials 230 and number of materials 232 may be selected such that number of materials 230 and number of materials 232 protect equipment within aircraft 100 from electromagnetic interference.

In these illustrative examples, the different components in sealing member 212 are formed as a single composite component. For example, number of materials 232 for sealing section 218 and number of materials 230 in components 228 for integral structure 216 may be consolidated at the same time. As an example, number of materials 232 for sealing section 218 and number of materials 230 in components 228 for integral structure 216 may be cured at the same time.

In these depicted examples, integral structure 216 may be incorporated into thermosetting matrix materials and thermoplastic matrix materials to form the composite structure. These thermosetting materials and thermoplastic materials may be used singularly or in combination when incorporating integral structure 216. In other words, only thermosetting materials may be used, only thermoplastic materials may be used, or some combination thereof may be used as a mixture. When mixtures of thermosets and thermoplastics are used, the thermosets may be precured or co-cured with the thermoplastics, depending on process capability of the two materials.

In these illustrative examples, sealing system 202 may also include a number of layers 236. Number of layers 236 may be present on sealing member 212. A layer in the number of layers 236 may be selected from at least one of a conductive layer, a conductive scrim, a wear resistant layer, paint, a protective coating, a sealant, an applique, and other suitable types of layers.

Further, number of materials 232 have coefficient of thermal expansion 242. Coefficient of thermal expansion 242 for number of materials 232 in sealing section 218 and coefficient of thermal expansion 242 for number of materials 232 in engagement section 220 may be selected to match coefficients of thermal expansion for other components on which sealing system 202 is installed. For example, coefficient of thermal expansion 242 for number of materials 232 in at least one of sealing section 218, engagement section 220, and attachment section 222 may be selected to substantially correspond or match the coefficient of thermal expansion for those of structures 206.

In one example, coefficient of thermal expansion 242 for engagement section 220 may substantially match coefficient of thermal expansion 246 for receiving structure 214. In this manner, the engagement between engagement section 220 and receiving structure 214 may be more likely to be maintained during operation of object 204.

The illustration of sealing environment 200 with sealing system 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, additional sealing systems may be present to seal surfaces 208 of other structures 206 in object 204 in other locations other than on the surface of structure 207. Further, in other illustrative examples, sealing section 218 and attachment section 222 may be manufactured as separate components and subsequently spliced or bonded together to form a single component.

In still other illustrative examples, the number of layers 236 may be absent from sealing system 202. In some illustrative examples, receiving structure 214 also may be considered a part of sealing system 202.

In still other illustrative examples, receiving structure 214 may be formed in a number of different ways. For example, receiving structure 214 may be formed as a separate piece by injecting materials, by assembling in place using curable materials such as epoxies, by machining panel edges and controlling gap widths, or combinations thereof.

Figure 3:
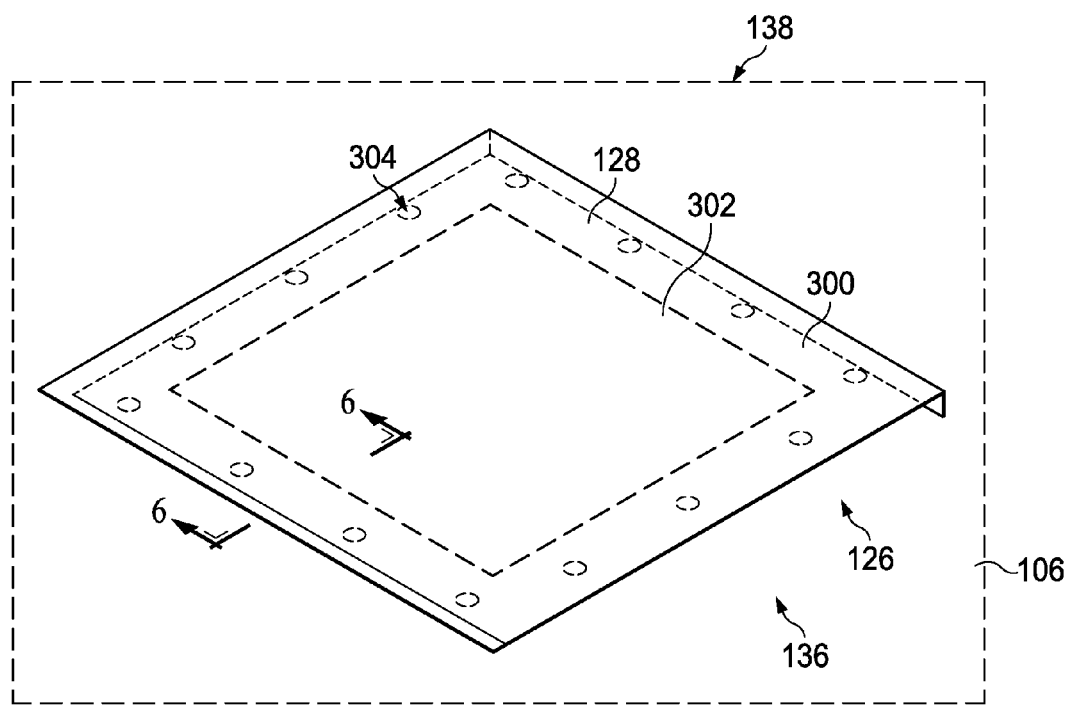
FIG. 3 is a more detailed illustration of an access panel with a sealing system in accordance with an illustrative embodiment.

With reference now to FIG. 3, a more detailed illustration of an access panel with a sealing system is depicted in accordance with an illustrative embodiment. In this view of section 138, a more detailed view of service panel 128 with sealing system 136 is shown. As can be seen, sealing system 136 comprises sealing member 300.

Sealing member 300 is an example of a physical implementation for sealing member 212 shown in block form in FIG. 2. In this illustrative example, sealing member 300 covers service panel 128 which is shown in phantom below sealing member 300.

Service panel 128 in turn, covers opening 302 in fuselage 106. Service panel 128 in fuselage 106 is an example of a physical implementation of structure 207 in structures 206 in FIG. 2. Opening 302 is an example of a physical implementation for a feature in features 210 shown in block form in FIG. 2.

In this illustrative example, service panel 128 may be secured to fuselage 106 using fasteners 304. In these illustrative examples, fasteners 304 are located under sealing member 300 and shown in phantom to indicate their locations under sealing member 300. Fasteners 304 may be any type of fasteners such as bolt or rivets.

Figure 4:
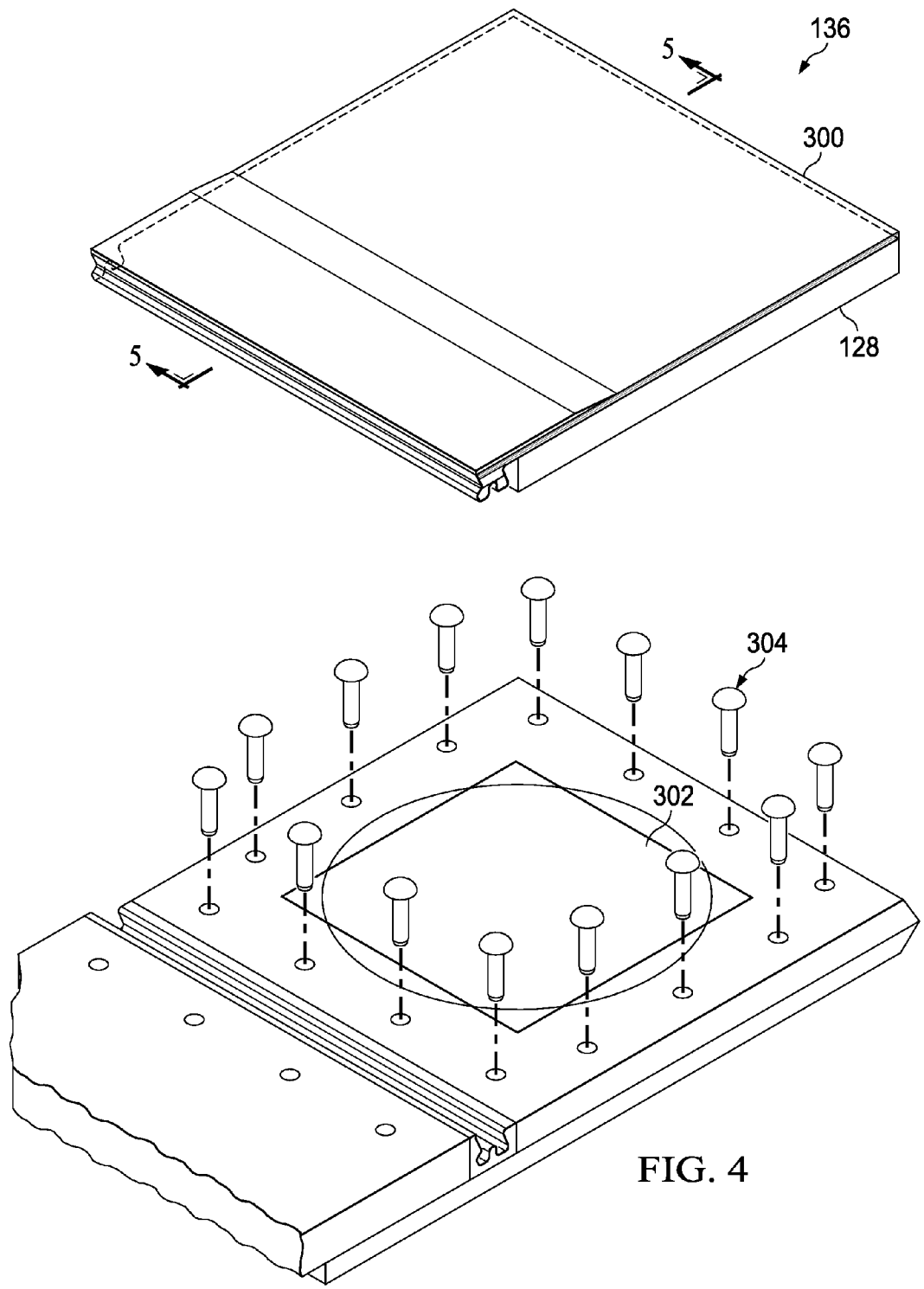
FIG. 4 is an illustration of an exploded view of a sealing system and an access panel in accordance with an illustrative embodiment.

Turning now to FIG. 4, an illustration of an exploded view of a sealing system and an access panel is depicted in accordance with an illustrative embodiment. In this depicted example, an exploded view of sealing member 300 and service panel 128 is depicted. As can be seen in this illustrative example, sealing member 300 is substantially planar.

Figure 5:
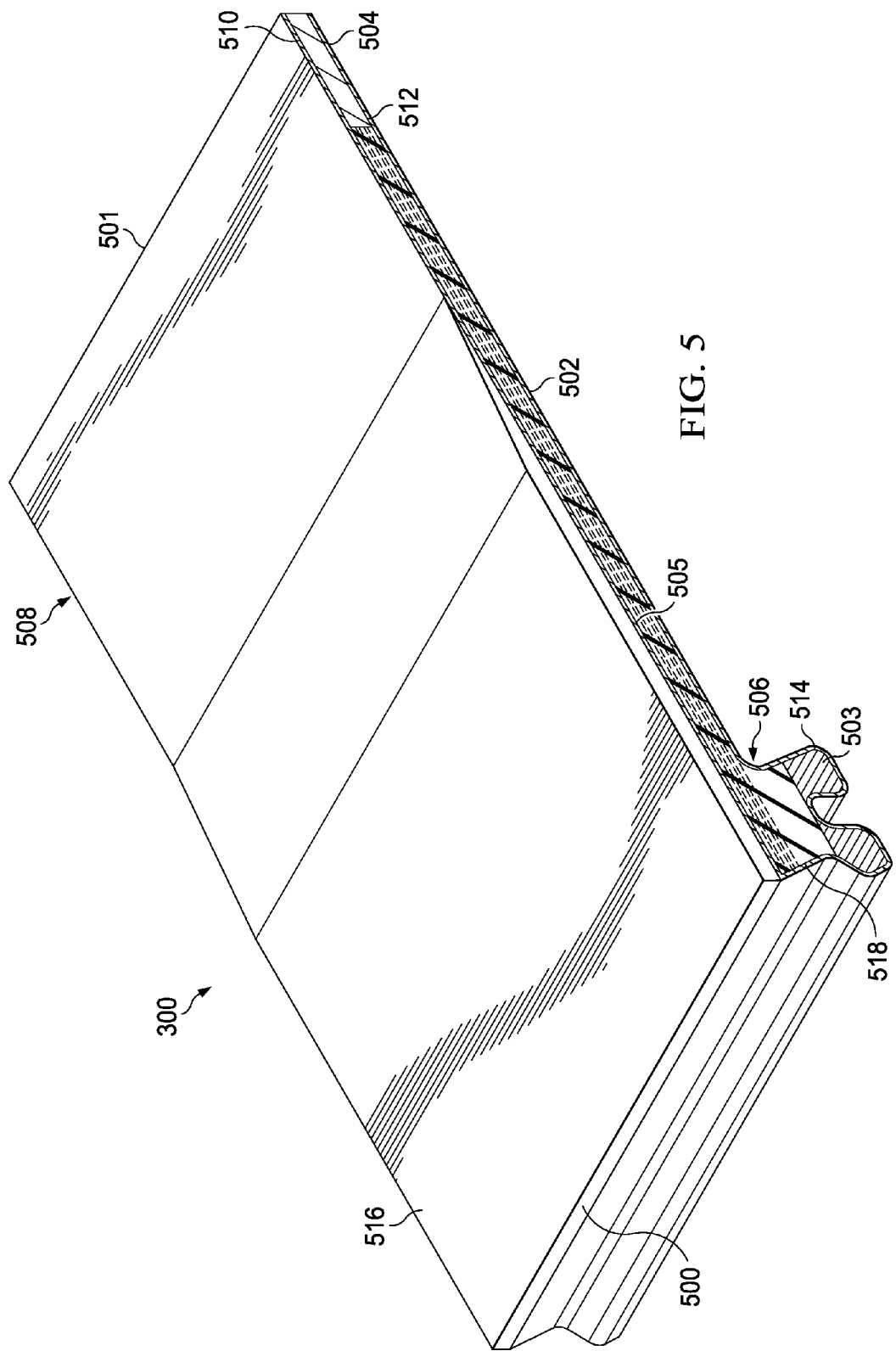
FIG. 5 is a cross-sectional view of a sealing member in accordance with an illustrative embodiment.

Turning now to FIG. 5, a cross-sectional view of a sealing member is depicted in accordance with an illustrative embodiment. In this depicted example, a cross-sectional view of sealing member 300 is depicted. In this example, the cross-sectional view is an isometric view taken along lines 5-5 in FIG. 4.

In this view, sealing member 300 has first end 500 and second end 501. Sealing member 300 also includes sealing section 502, engagement section 503, and attachment section 504 in addition to engagement section 503.

In this illustrative example, sealing member 300 also includes integral structure 505 within the interior of sealing section 502. In this illustrative example, integral structure 505 is shown as being located in sealing section 502. In other illustrative examples, integral structure 505 may also extend into at least one of engagement section 503 and attachment section 504.

In these illustrative examples, integral structure 505 is configured to allow sealing member 300 to carry a desired load. This desired load may take various forms such as an aerodynamic load, a mechanical load, a static load, a dynamic load, a random load, a load caused by vibrations, and other suitable types of loads.

In these illustrative examples, sealing member 300 also may include number of layers 506 covering at least a portion of sealing member 300. As depicted, number of layers 506 may be placed on one or more of surfaces 508 of sealing section 502. For example, number of layers 506 may be located on at least one of first surface 510 and second surface 512 of sealing member 300.

As depicted, number of layers 506 includes wear resistant layer 514, conductive layer 516, and conductive scrim 518. Of course, other types of layers may be included in addition to or in place of the ones illustrated. For example, number of layers 506 may also include paint, a protective coating, a sealant, an appliqué, and other suitable layers.

In this illustrative example, attachment section 504 is shown as being located at second end 501 of sealing member 300. As depicted, attachment section 504 is configured to be attached to service panel 128 in these illustrative examples. As depicted, engagement section 503 extends from second surface 512 of sealing member 300 in a direction that is substantially perpendicular to second surface 512.

In this illustrative example, engagement section 503 is comprised of a material that is capable of deforming when a selected amount of pressure is applied and substantially returning to the original shape when the pressure is no longer applied. In this illustrative example, engagement section 503 deforms in a manner that allows engagement section 503 to be placed into a receiving structure (not shown) in fuselage 106 and substantially return to its original shape to engage a receiving structure (not shown) in fuselage 106 in these illustrative examples.

In this illustrative example, wear resistant layer 514 is a layer in number of layers 506 that may be used to reduce wear on sealing member 300. In particular, wear resistant layer 514 may reduce the occurrence of tears or rips in sealing member 300.

Wear resistant layer 514 may be comprised of any material that may also be pliable. These materials may include, for example, polyethylene terephthalate, terylene, polyester, nylon, or other suitable types of materials.

As depicted, conductive layer 516 may be used to provide protection from electromagnetic interference (EMI). This protection may be provided for components such as electronic devices that may be located within aircraft 100.

Conductive scrim 518 is an example of another form for a conductive layer. Conductive scrim 518 may be any type of conductive material that is also pliable. For example, conductive scrim 518 may be a mesh, gauze, a conductive polymer, or some other type of material. As another example, conductive scrim 518 may be silver plated.

As can be seen, number of layers 506 may cover a portion or all of sealing member 300 depending on the particular implementation. These layers may be attached at the time of seal fabrication or added later with the use of adhesive or spray methods to surfaces 508 of sealing member 300 through adhesives or other mechanisms. For example, an epoxy may be used to attach number of layers 506 to surfaces 508 in these illustrative examples. These layers may be co-consolidated at the time of fabrication of the seal.

In some illustrative examples, one or more of number of layers 506 may be applied as a liquid that coats and dries on sealing member 300. In these illustrative examples, number of layers 506 may be selected as being substantially pliable such that bending of sealing member 300 does not cause number of layers 506 to disengage from surfaces 508 of sealing member 300 or from other layers in number of layers 506.

Figure 6:
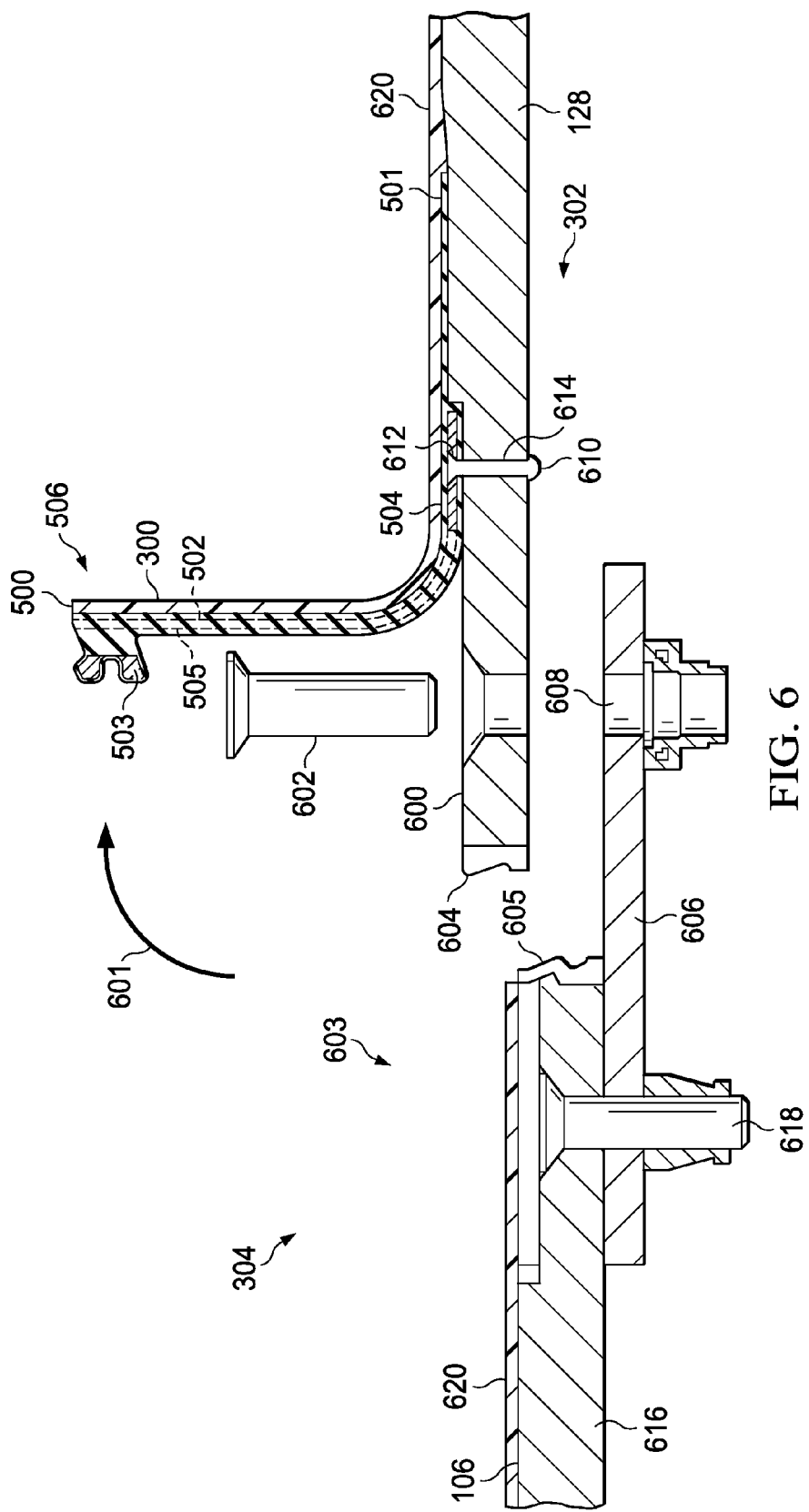
FIG. 6 is an illustration of a cross-sectional view of a sealing system for structures on an aircraft in accordance with an illustrative embodiment.

With reference now to FIG. 6, an illustration of a cross-sectional view of a sealing system for structures on an aircraft is depicted in accordance with an illustrative embodiment. In this example, the cross-sectional view is an isometric view taken along lines 6-6 in FIG. 3. In this cross-sectional view, sealing member 300 is shown as being bent away from surface 600 of service panel 128 in the direction of arrow 601.

In this cross-sectional view, fasteners 304 including fastener 602 have been removed and service panel 128 has been disengaged from fuselage 106 such that the interior of aircraft 100 may be accessed through opening 302.

In this illustrative example, receiving structure 603 is formed by first member 604 and second member 605. First member 604 is associated with service panel 128. Second member 605 is associated with fuselage 106.

Engagement section 503 is configured to be engaged with receiving structure 603 and, in particular, with first member 604 and second member 605 when service panel 128 is placed onto substructure 606. Additionally, fastener 602 may secure service panel 128 to substructure 606 in fuselage 106 when placed into hole 608.

Additionally, sealing member 300 is connected to service panel 128 by fastener 610. Fastener 610 may be placed into hole 612 in attachment section 504 of sealing member 300 and then through hole 614 in service panel 128.

In this illustrative example, panel 616 in fuselage 106 is connected to substructure 606 by fastener 618. Coating 620 may cover second member 605 and sealing member 300. Coating 620 may be configured to provide a smooth surface for fuselage 106.

Turning now to FIG. 7, an illustration of a sealing system on a service panel in an aircraft is depicted in accordance with an illustrative embodiment. In this depicted example, a cross-sectional view taken along lines 6-6 in FIG. 3 is depicted. In this depicted example, sealing member 300 is shown as being installed onto seal service panel 128 as well as panel 616 in fuselage 106.

In this illustrative example, engagement section 503 is shown as being engaged with receiving structure 603. In particular, engagement section 503 may be deformed such that engagement section 503 fits into receiving structure 603 and, in particular, engages first member 604 and second member 605 as shown in this figure. In these illustrative examples, the shape of engagement section 503 is such that when engagement section 503 substantially returns to its original shape, engagement section 503 may remain engaged in receiving structure 603 during operation of aircraft 100.

In some illustrative examples, engagement section 503 may be a thermoplastic material which may be sufficiently pliable to place into receiving structure 603 when heated. Once engagement section 503 cools, engagement section 503 may no longer be sufficiently pliable to be removed from receiving structure 603. In this manner, engagement section 503 may not be removed unless sufficient heat is applied to engagement section 503 at a later time when access is needed to service panel 128.

Turning now to FIGS. 8-11, illustrations of the installation of a sealing system is depicted in accordance with an illustrative embodiment.

With reference first to FIG. 8, an illustration of service panel 128 attached to substructure 606 in fuselage 106 is depicted in accordance with an illustrative embodiment. In this example, sealing system 136 may be installed to provide a desired smoothness for fuselage 106 in this location. Sealing system 136 may be used to seal surface 802 of panel 620, surface 804 of service panel 128, and surface 806 of substructure 606 in fuselage 106 in these illustrative examples.

In FIG. 9, sealing member 300 in sealing system 136 may be installed onto service panel 128. This installation may be made by associating attachment section 504 of sealing member 300 with service panel 128. In this illustrative example, this association may be made using fastener 610 installed through opening 614 in service panel 128. Additionally, second member 605 may be attached to service panel 128.

Turning now to FIG. 10, an illustration of the installation of components for a sealing system is depicted in accordance with an illustrative embodiment. In this view, first member 604 is associated with panel 616 in fuselage 106. In this manner, when service panel 128 is secured to substructure 606, engagement section 503 may engage receiving structure 603 such that sealing member 300 may be held in a desired configuration on service panel 128.

Figure 11:
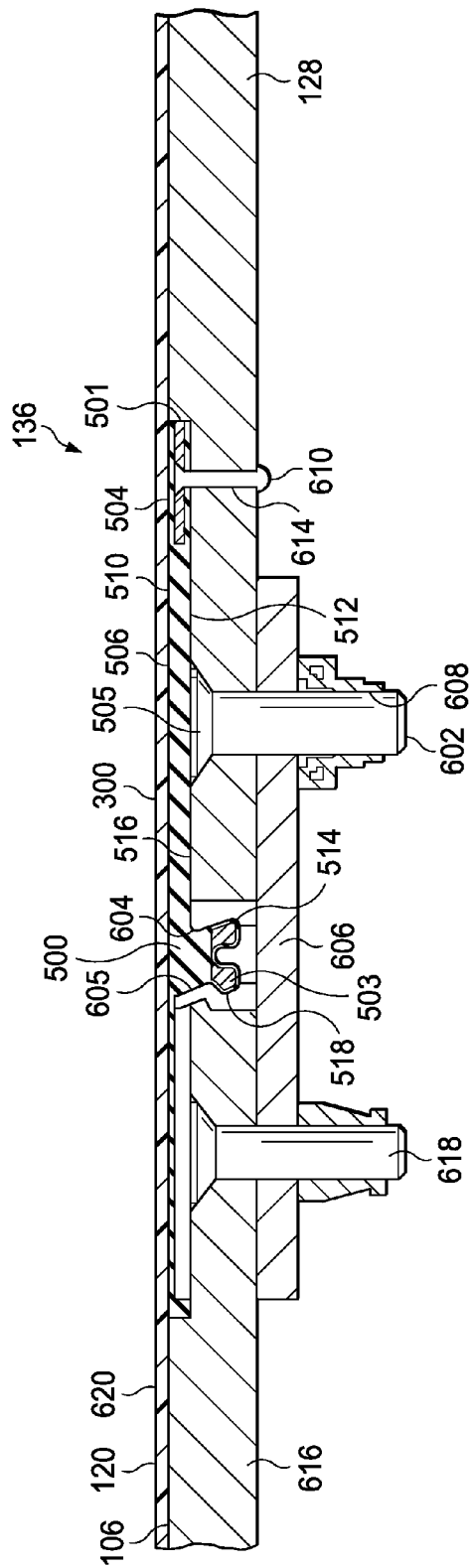

With reference now to FIG. 11, an illustration of an installed sealing system is depicted in accordance with an illustrative embodiment. In this view, coating 620 has been placed over panel 616, service panel 128, and sealing member 300 to provide a desired smoothness on the surface of aircraft 100. Coating 620 may take the form of paint, sealants, and other materials. In these illustrative examples, coating 620 sticks to panel 616 and is pliable such that it does not crack when sealing member 300 is bent.

While coating 620 is shown in this figure as being applied to these components after sealing member 300 has been installed, coating 620 may be applied at a different time during manufacturing. For instance, in other illustrative examples, coating 620 may be applied as a layer of material consolidated during manufacture of sealing member 300. Coating 620 may be a pigmented thermoplastic or a pigmented thermoset material that is manufactured as part of sealing member 300.

Figure 12:
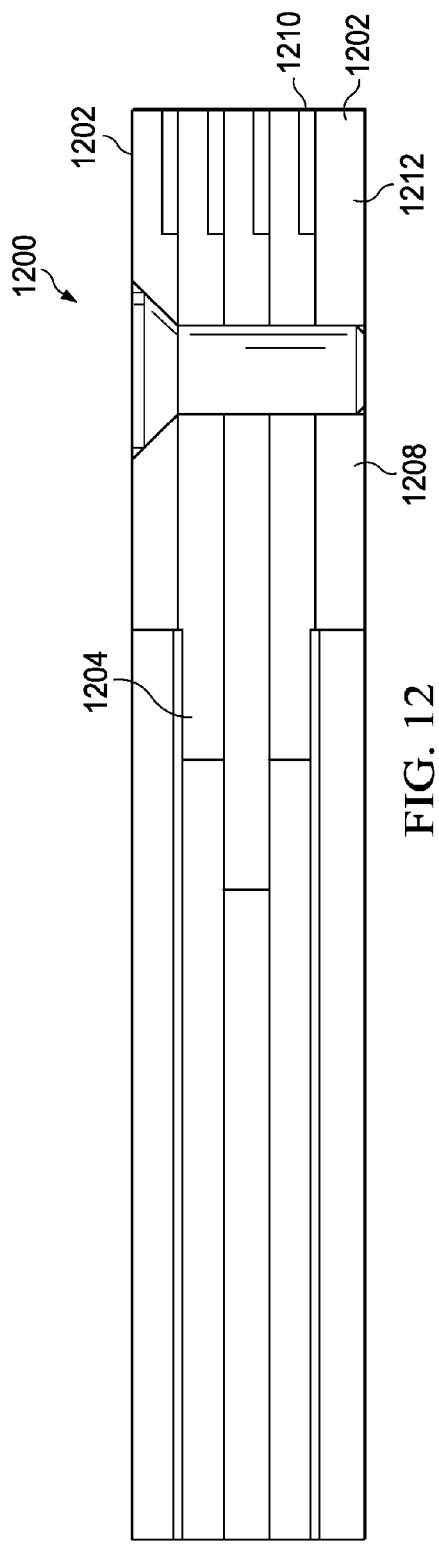
FIG. 12 is an illustration of a sealing system in accordance with an illustrative embodiment.

Turning now to FIG. 12, an illustration of a sealing system is depicted in accordance with an illustrative embodiment. In this depicted example, sealing system 1200 is an example of another implementation for sealing system 202 shown in block form in FIG. 2.

In this depicted example, sealing system 1200 includes sealing member 1202. Sealing member 1202 includes attachment section 1204. In this illustrative example, attachment section 1204 is shown extending from end 1208 of sealing member 1202 rather than from a surface on a side of sealing member 1202.

As depicted, sealing member 1202 also includes integral structure 1210 in sealing section 1212. In this illustrative example, attachment section 1204 may be comprised of a thermoplastic material that may be pliable when heated to allow for insertion and removal from a receiving structure. In this illustrative example, sealing member 1202 may cover a structure such as service door, access panel, or other structure.

With reference now to FIG. 13, an illustration of another configuration for a sealing system is depicted in accordance with an illustrative embodiment. In this illustrative example, sealing system 1300 is another example of an implementation of sealing system 202 shown in block form in FIG. 2.

In this depicted example, sealing system 1300 comprises sealing member 1302. Sealing member 1302 has sealing section 1304 and engagement section 1306.

Sealing section 1304 includes integral structure 1308. Integral structure 1308, in this illustrative example, may comprise dry cloth or prepregged cloth with thermoplastic resin. When integral structure 1308 includes dry cloth with thermoplastic resin, consolidation of these materials may occur under vacuum and heat. Alternatively, when integral structure 1308 includes prepregged cloth with thermoset resin in addition to the thermoplastic resins, these materials may be cured prior to or during the vacuum heat consolidation.

In this illustrative example, sealing member 1302 also may include layers 1310. Layers 1310 may include conductive scrim 1312 and surface coating 1314. Surface coating 1314 may be a pigmented thermoset material such as paint or another pigmented layer of thermoplastic to provide a desired color, smoothness, or conductivity for sealing system 1300.

In these illustrative examples, engagement section 1306 is configured to engage receiving structure 1316. Receiving structure 1316 may be a single component or multiple components depending on the particular implementation.

Engagement section 1306 is pliable and configured to deform to fit into receiving structure 1316. When engagement section 1306 returns to its original shape after being placed into receiving structure 1316, engagement section 1306 may be configured to remain within receiving structure 1316 until sufficient force is applied to disengage these two components. This force is typically selected to be greater than forces that may be encountered during operation of the aircraft in these illustrative examples.

The illustration of the different sealing systems and their use on different structures in FIG. 1 and FIGS. 2-13 is not meant to imply limitations to the manner in which sealing system 202 shown in block form in FIG. 2 may be implemented. These illustrations of configurations for sealing systems are only intended as examples of some implementations. Other implementations may be used depending on the particular application and environment.

For example, although engagement section 503 is shown as having a particular shape in FIGS. 5-11, engagement section 503 may have other shapes. For example, engagement section 503 may have any shape such that engagement section 503 may engage with receiving structure 603. As an example, engagement section 503 may have an oblong shape, a circular shape, a rectangular shape, a spherical shape, or some other suitable type of shape.

Further, the shape of engagement section 503 relative to receiving structure 603 may be such that pressure or heat applied to engagement section 503 allows engagement section 503 to engage with receiving structure 603. In other words, depending on the properties of the material in engagement section 503, engagement section 503 may be larger than receiving structure 603, substantially the same size as receiving structure 603, or in some other configuration. As the deformability of engagement section 503 increases, the size of engagement section 503 may also increase. As a result, a more secure seal may be formed once engagement section 503 engages receiving structure 603.

In still other illustrative examples, a filler may be used between engagement section 503 and receiving structure 603 such that any space between engagement section 503 and receiving structure 603 is filled. This filler may be an epoxy, a polyester body filler, or some other type of filler material. This filler may be selected such that the space between engagement section 503 and receiving structure 603 is filled in a desired manner and increases the security of the seal in these illustrative examples. In other illustrative examples, this filler may not fill the entire space between engagement section 503 and receiving structure 603. In other words, the filler may only fill a portion of the space between engagement section 503 and receiving structure 603 in these illustrative examples.

Additionally, this filler may fill other areas of sealing member 212 in FIG. 2, engagement section 503, or other components in sealing system 202 to create a smooth transition between surfaces of aircraft 100 in FIG. 1. Once this filler is added to the structure, the structure may be faired such that the outer portions of the surfaces are smooth.

In still other illustrative examples, the components shown in FIG. 5-13 may be assembled in position. In other words, the components shown in these figures may be assembled in a desired position instead of being assembled and subsequently installed in a desired position.

Moreover, the different components shown in FIG. 1 and FIGS. 3-13 may be combined with components in FIG. 2, used with components in FIG. 2, or a combination of the two. Additionally, some of the components in FIG. 1 and FIGS. 3-13 may be illustrative examples of how components shown in block form in FIG. 2 can be implemented as physical structures.

Turning now to FIG. 14, an illustration of a flowchart of a process for sealing an object is depicted in accordance with an illustrative embodiment. The process illustrated in FIG. 14 may be implemented in sealing environment 200 in FIG. 2. In particular, the different operations may be implemented using sealing system 202 in FIG. 2.

The process begins by attaching a sealing member to a surface of a structure on an object (operation 1400). The sealing member includes an integral structure within the sealing structure. The process also attaches a receiving structure to the object (operation 1402).

Next, an attachment section in the sealing member is engaged with the receiving structure in the object (operation 1404). The attachment section extends from the sealing member and is deformable in these illustrative examples. Of course, the attachment section may be comprised of a thermoplastic material that may be deformable when heated and less deformable when cooled. In this manner, the attachment section may not be removable from the receiving structure when cooled during operation of the object.

Then the process may add a number of layers on the sealing member (operation 1406) with the process terminating thereafter. In other illustrative examples, the number of layers may be added during seal construction. In other words, in some alternative implementations of an illustrative embodiment, operation 1406 may be omitted if the number of layers is already included during seal construction.

As a result of the process illustrated in FIG. 14, the seal will be integrated to surrounding aircraft mold-line layers and finishes. This integration may occur such that aircraft requirements or other guidelines are met.

In these illustrative examples, the attachment section may be selectively disengaged and re-engaged to provide access to the surface of the object. This access to the surface of the object may be to access components such as a service panel, a service door, or other component.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512 and/or during maintenance and service 1514 in FIG. 15. The use of a number of the different illustrative embodiments may substantially expedite the assembly of and/or reduce the cost of aircraft 1600.

One or more illustrative embodiments may be implemented during component and subassembly manufacturing 1506 to create seals for different components in aircraft 1600. Further, an illustrative embodiment may be implemented during in service 1512 to provide access to various surfaces and structures in aircraft 1600. In still other illustrative examples, access to different structures in aircraft 1600 may be provided through an illustrative embodiment to perform routine maintenance, upgrades, refurbishment, and other operations. Further, a sealing system in accordance with an illustrative embodiment also may be installed into aircraft 1600 during maintenance and service 1514.

Thus, the illustrative embodiments provide a method and apparatus for sealing an object. With the use of an illustrative embodiment including thermoplastic materials, the cost of manufacture of sealing systems for composite structures may be reduced. In particular, because an autoclave is not needed in the consolidation process, the cost of manufacturing a sealing system may be reduced. Further, sealing systems may be reusable when implemented with an illustrative embodiment.

Moreover, coatings required for sealing systems may be manufactured at the same time as the sealing system. In this manner, the manufacture of sealing systems with coatings may be conducted more efficiently than with currently used manufacturing methods. Likewise, modification in the design of the sealing system for the composite structure may be conducted more quickly and efficiently than with currently used methods because modification may be completed using the same low-cost process as described herein.

In addition, the use of an illustrative embodiment provides an ability to splice sections of the sealing system such that an operator may form and repair continuous seals. With the use of an illustrative embodiment, the coefficient of thermal expansion of the materials used in the sealing system also may be selected such that the coefficient of thermal expansion of the materials matches that of other components on which the sealing system is installed. As a result, manufacture of sealing systems implemented with an illustrative embodiment provide for desired performance of the sealing system for the composite structure.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus configured to seal a object on an aircraft, the apparatus comprising:
   a receiving structure;
   a sealing member that comprises a sealing section configured substantially as a planar sheet, an engagement section that extends, substantially perpendicular, away from a length and a first surface of the sealing section, and an attachment section that extends from an end of the length of the sealing section, and an integral structure consolidated between the first surface and a second surface of the sealing member, the first surface being an exterior surface of the sealing member on a side of the sealing member opposite the second surface, and the second surface of the sealing member being an exterior side of the sealing member configured as a continuous surface, common to the sealing section and the attachment section, and configured to face and connect to the object, such that the integral structure comprises at least four layers, comprising fibers, separated from each other and consolidated within a matrix between the first surface and the second surface of the sealing section, such that the sealing member comprises a load carry capacity; and the engagement section comprises thermoplastic material configured such that a perimeter of the engagement section conforms to and engages a shape of the receiving structure and comprises a wear resistant layer that continues beyond the perimeter of the engagement section and becomes the second surface of the sealing member.

2. The apparatus of claim 1 further comprising:
   the receiving structure, wherein the receiving structure comprises a configuration that retains the engagement section such that the sealing member is held in place via contacting an entirety of the perimeter of the engagement section.

3. The apparatus of claim 1, wherein the integral structure extends into the engagement section, and the engagement section comprises urethane.

4. The apparatus of claim 1, wherein the engagement section is located on one end of the sealing member and a side of the sealing member that faces the receiving structure.

5. The apparatus of claim 1 further comprising:
   a number of layers of material covering at least a portion of the sealing member.

6. The apparatus of claim 5, wherein the number of layers is selected from at least one of a conductive layer, a conductive scrim, the wear resistant layer, a paint, a protective coating, a sealant, and an appliqué.

7. The apparatus of claim 1, wherein the integral structure a number of materials selected from at least one of: a thermoset material, and a thermoplastic material.

8. The apparatus of claim 1, wherein the sealing member comprises a thermoset material.

9. The apparatus of claim 1 further comprising:
   the wear resistant layer comprises at least one of: polyethylene, terephthalate, and terylene.

10. The apparatus of claim 1, wherein the integral structure is comprised of at least one of a fabric, a cloth, threads, tows, rods, a reinforcement infused with resin, and a prepreg, and the integral structure is co-cured with the sealing member.

11. The apparatus of claim 1, wherein the sealing section comprises a number of materials selected from at least one of a unidirectional material, fiberglass, a para-aramid, carbon, and metal.

12. The apparatus of claim 1, further comprising the sealing member configured such that in operation the sealing member provides a seal for a feature selected from one of: a door, a service panel, a cover, an opening, a gap, and an aperture, in the object.

13. A method for sealing at least one of: a door, a service panel, a cover, an opening, a gap, and an aperture, in a surface of an object, the method comprising:
   consolidating an integral structure between a first surface and a second surface of a sealing member comprising a sealing section abutting an attachment section configured substantially as a planar sheet, the first surface being an exterior surface of the sealing member on a side of the sealing member opposite the second surface, and the second surface of the sealing member being an exterior side of the sealing member configured as a continuous surface, common to the sealing section and the attachment section, and configured to face and connect to the object;
   co-curing the sealing member with the integral structure, the integral structure comprising at least four layers, comprising fibers, separated from each other and consolidated within a matrix between the first surface and the second surface of the sealing section;
   deforming an engagement section, via heating the engagement section such that a perimeter of the engagement section conforms to a shape of a receiving structure, and then cooling the engagement section;
   enclosing the engagement section within a wear resistant layer that continues beyond the perimeter of the engagement section, thus forming the second surface of the sealing member;
   engaging the engagement section with the receiving structure; and
   attaching the sealing member to a surface of a structure on the object.

14. The method of claim 13 further comprising:
   the integral structure extending into the engagement section; and
   attaching the receiving structure to the object prior to the engagement section engaging the receiving structure.

15. The method of claim 13, further comprising:
   the sealing member comprising a number of layers; and
   the integral structure providing a load carrying capacity to the sealing member.

16. The method of claim 15 further comprising:
   the engagement section comprising urethane; and
   adding the number of layers to at least a portion of the sealing member after engaging the engagement section.

17. The method of claim 16, further comprising:
   spraying a coating on the sealing member after attaching the sealing member and engaging the engagement section.

18. The method of claim 13 further comprising:
   disengaging the engagement section from the receiving structure; and
   bending the sealing member such that a portion of the structure is accessible.

19. The method of claim 13 further comprising:
the wear resistant layer comprising at least one of: polyethylene, terephthalate, and terylene; and
engaging the engagement section with the receiving structure such that the sealing member seals the structure when access to the structure is no longer needed.

* * * * *